(12) United States Patent
Keohane et al.

(10) Patent No.: US 8,041,680 B2
(45) Date of Patent: Oct. 18, 2011

(54) BACKING UP A DATABASE

(75) Inventors: Susann M. Keohane, Austin, TX (US);
Gerald F. McBrearty, Austin, TX (US);
Shawn P. Mullen, Buda, TX (US);
Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 11/760,336

(22) Filed: Jun. 8, 2007

(65) Prior Publication Data
US 2008/0307015 A1    Dec. 11, 2008

(51) Int. Cl.
*G06F 17/30* (2006.01)

(52) U.S. Cl. .............................. 707/647; 707/999.204

(58) Field of Classification Search .................. 707/200, 707/202, 204, 610, 618, 647, 649, 654, 655, 707/999.2, 999.202, 999.204; 711/162
See application file for complete search history.

(56) References Cited

U.S. PATENT DOCUMENTS

| | | | |
|---|---|---|---|
| 5,913,160 A | 6/1999 | Leung | |
| 6,581,075 B1 | 6/2003 | Guturu et al. | |
| 7,447,857 B2 * | 11/2008 | Lyon | 711/162 |
| 7,519,602 B2 * | 4/2009 | Klemba et al. | 707/10 |
| 2004/0193952 A1 | 9/2004 | Narayanan et al. | |
| 2007/0055716 A1 * | 3/2007 | Mikami | 707/204 |

* cited by examiner

*Primary Examiner* — Marc Filipczyk
(74) *Attorney, Agent, or Firm* — Kunzler Needham Massey & Thorpe (57) ABSTRACT

Backing up a database, including providing, in the database by a DBMS, at least one record with at least one backup field, the backup field being a data element that controls the backing up of the record, and backing up, by a backup module, the a record in dependence upon a value of the backup field.

12 Claims, 5 Drawing Sheets

BACKING UP A DATABASE

BACKGROUND OF THE INVENTION

1. Field of the Invention

The field of the invention is data processing, or, more specifically, methods, apparatus, and products for backing up a database.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. The most basic requirements levied upon computer systems, however, remain little changed. A computer system's job is to access, manipulate, and store information. Computer system designers are constantly striving to improve the way in which a computer system can deal with information.

Information stored on a computer system is often organized in a structure called a database. A database is a collection of related data and metadata. Metadata is data that describes other data such as, for example, data statistics. The data of a database is typically grouped into related structures called 'tables,' which in turn are organized in rows of individual data elements. The rows are often referred to a 'records,' and the individual data elements are referred to as 'fields' or 'columns.' In this specification generally, therefore, an aggregation of fields is referred to as a 'record' or a 'data structure,' and an aggregation of records is referred to as a 'table.'

The metadata of a database typically includes schemas, table indexes, and database statistics. A schema is a structural description of the data in the database. A schema typically defines the columns of a table, the data types of the data contained in each column, which columns to include in an index, and so on. An index is a database structure used to optimize access to the rows in a table. An index is typically smaller than a table because an index is created using one or more columns of the table, and an index is optimized for quick searching, usually via a balanced tree. Database statistics describe the data in tables of a database. Database statistics may describe, for example, the number of records having a particular value for a particular field. As with the data of a database, metadata is often stored in tables of the database.

A computer system typically operates according to computer program instructions in computer programs. A computer program that supports access to information in a database is typically called a database management system or a 'DBMS.' A DBMS is computer software that is responsible for helping other computer programs access, manipulate, and save information in a database. A DBMS often utilizes metadata of the database for accessing and manipulating data of the database.

A DBMS typically supports access and management tools to aid users, developers, and other programs in accessing information in a database. One such tool is the structured query language ('SQL'). SQL is query language for requesting information from a database. Although there is a standard of the American National Standards Institute ('ANSI') for SQL, as a practical matter, most versions of SQL tend to include many extensions. Here is an example of a database query expressed in SQL:

select*from stores, transactions
    where stores.location="Rochester"
    and stores.storeID=transactions.storeID This SQL query accesses information in a database by selecting records from two tables of the database, one table named 'stores' and another table named 'transactions.' The records selected are those having value 'Rochester' in their store location field and transactions for the stores in Rochester. To retrieve the result for this SQL query, the DBMS generates a number of 'primitive queries,' each primitive query used to retrieve a portion of the data needed to satisfy the SQL query. In retrieving the data for this SQL query, an SQL engine will first use a primitive query generated by the DBMS to retrieve records from the stores table and then use another primitive query to retrieve records from the transaction table. Records that satisfy the primitive query requirements then are merged in a 'join' and returned as a result of the SQL query received by the DBMS.

To guard against loss of data from various causes, power failures, disk drive damage, or even operator error, databases are backed up. 'Backup' refers to making copies of data so that these additional copies may be used to restore the original in the event of data loss. Backups are useful primarily to restore a computer to an operational state following a large, disastrous loss of data as well as to restore small numbers of records after accidental deletion or corruption. Backups are typically that last line of defense against data loss, and consequently the least granular and the least convenient to use. A backup system often may contain one or more copies of all data worth saving, and the data storage requirements can be very large. Organizing this storage space and managing the backup process is a complicated undertaking.

SUMMARY OF THE INVENTION

Methods, apparatus, and computer program products are disclosed for backing up a database, including providing, in the database by a DBMS, at least one record with at least one backup field, the backup field being a data element that controls the backing up of the record, and backing up, by a backup module, the record in dependence upon a value of the backup field.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
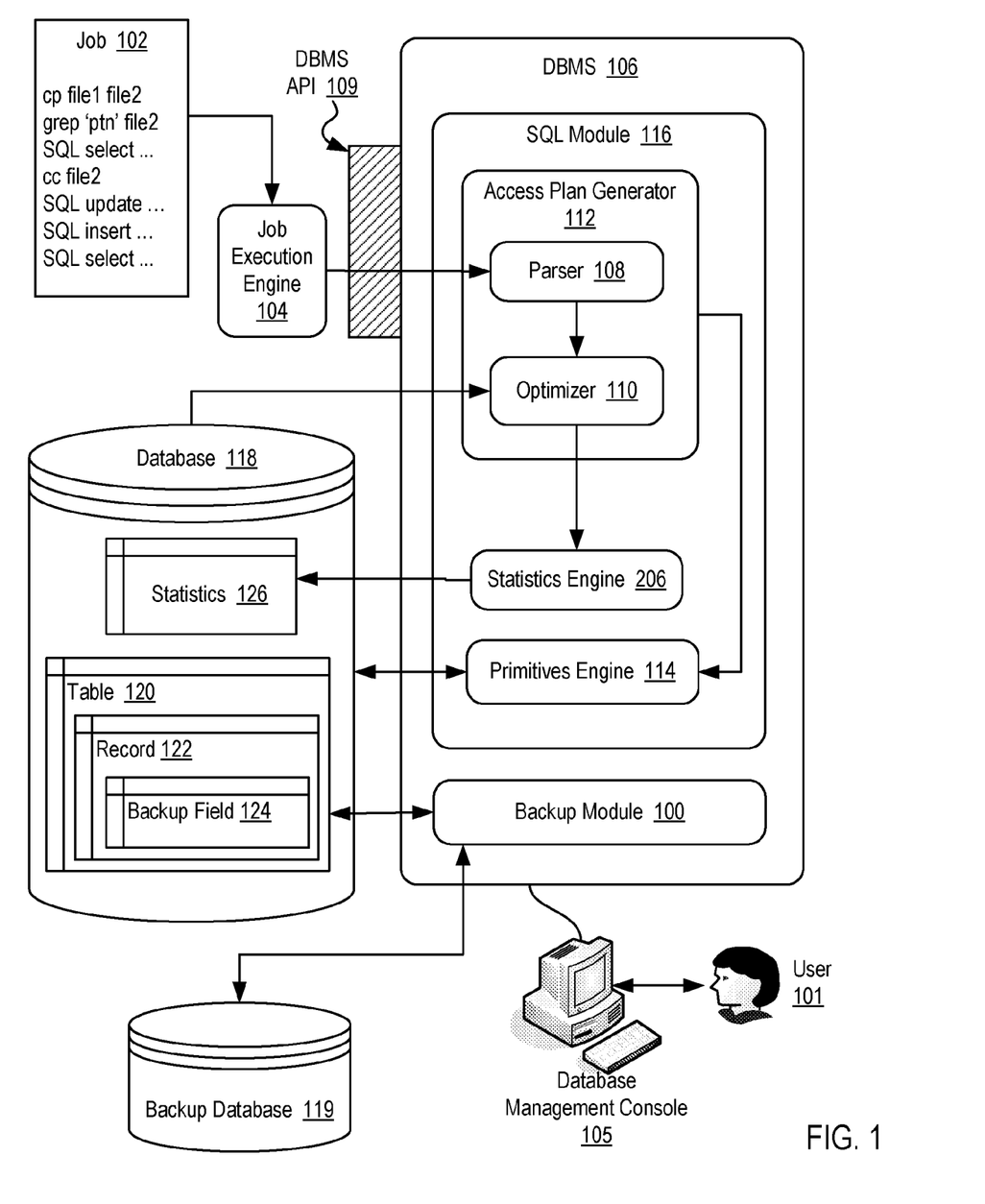
FIG. 1 sets forth a functional block diagram of an exemplary system for backing up a database according to embodiments of the present invention.

Exemplary methods, apparatus, and products for backing up a database according to embodiments of the present invention are described with reference to the accompanying drawings, beginning with FIG. 1. FIG. 1 sets forth a functional block diagram of an exemplary system for backing up a database according to embodiments of the present invention. The exemplary system of FIG. 1 includes a database (118). The database (118) stores data in tables (120), where the tables are composed of records (122) made up of fields, one of which in this example is a backup field (124), a data element that controls the backing up of the record. That is, the record (122) includes a backup field (124) that controls the backing up of the particular record containing the backup field.

The exemplary system of FIG. 1 includes a DBMS (106) to provide access tools and management tools to aid users, developers, and other programs in accessing the data stored in tables (120) of the database (118). Access and management tools provided by the DBMS (106) may be implemented as software modules inside the DBMS. In the exemplary system of FIG. 1, the DBMS (106) includes an SQL module (116). SQL module (116) is implemented as computer program instructions that execute an SQL query against the tables (120) of database (118).

In the exemplary system of FIG. 1, SQL module (116) receives SQL queries for execution from job execution engine (104). Job execution engine (104) is a software module that executes jobs, such as job (102), by passing commands from the jobs to software applications appropriate to the command. Jobs may mingle SQL queries with other commands to perform various data processing tasks. Job (102), for example, includes several commands for execution as part of job (102), including:
  "cp file1 file2," an operating system command to copy one file to another file,
  "grep 'ptn' file2," a general regular expression command of the operating system to find occurrences of 'ptn' in file 'file2',
  "cc file2," a command to compile file 'file2' as a C program, and
  several SQL commands, each of which passes call parameters identifying an SQL query to an executable command identified as 'SQL.'

In this example, job execution engine (104) will pass the operating system commands from job (102) to an operating system for execution and pass the SQL queries from job (102) to SQL module (116) for execution. Job execution engine (104) passes the SQL queries to SQL module (116) through an application programming interface ('API') (109) of database management system ('DBMS') (106). DBMS (106) exposes DBMS API (109) to enable applications, such as, for example, job execution engine (104), to access modules of the DBMS, such as, for example, SQL module (116). The DBMS API (109) provides a command set for administering the DBMS (106). The 'SQL' command illustrated in job (102) is an exemplary command in the command set exposed through DBMS API (109).

In the exemplary system of FIG. 1, SQL module (116) includes access plan generator (112). An access plan is a sequence of database operations for carrying out a query to the database. The access plan generator (112) of FIG. 1 is implemented as computer program instructions that create an access plan for an SQL query. An access plan is a description of database functions for execution of an SQL query. Taking the following SQL query as an example:
  select*from stores, transactions
  where stores.storeID=transactions.storeID,
access plan generator (112) may generate the following exemplary access plan for the exemplary SQL query above:
  tablescan stores
  join to
  index access of transactions This access plan represents database functions that are carried out by primitive queries to the database. In the example above, the DBMS uses primitive queries to scan through the stores table and, for each stores record, join all transactions records for the store. The transactions for a store in the transaction table are identified through the 'storeID' field serving as a foreign key. The fact that a selection of transactions records is carried out for each store record in the stores table identifies the join function as iterative.

The exemplary access plan generator (112) of FIG. 1 includes a parser (108) for parsing the SQL query. Parser (108) is implemented as computer program instructions that parse the SQL query. AN SQL query is presented to SQL module (116) in text form as the parameters of an SQL command. Parser (108) retrieves the elements of the SQL query from the text form of the query and places them in a data structure more useful for data processing of an SQL query by SQL module (116).

In the exemplary system of FIG. 1, access plan generator (112) also includes an optimizer (110) implemented as computer program instructions that optimize the access plan in dependence upon database management statistics (126). Database statistics may reveal, for example, that there are only two values for 'storeID' in the transactions table—so that it is more efficient to scan the transactions table rather than using an index to locate records with a particular value for 'storeID.' Alternatively, database statistics may reveal that there are many transaction records with only a few transactions records for each value for 'storeID'—so that it is more efficient to access the transactions records by an index.

Database statistics are typically implemented as metadata of a particular database table, such as, for example, metadata of tables (120) of database (118). Database statistics (126) may include, for example:
  Histogram statistics: a histogram range and a count of values in the range,
  Frequency statistics: a frequency of occurrence of a value in a column, and
  Cardinality statistics: a count of the number of different values in a column.

These three database statistics are presented for explanation only, not for limitation. The use of any database statistics as will occur to those of skill in the art is well within the scope of the present invention. When the optimizer attempts to use databases statistics for a column of a table, for example, and finds the database statistics missing or stale, the optimizer (110) notifies statistics engine (206). Statistics engine (206) then generates the missing or stale statistics.

In the exemplary system of FIG. 1, the exemplary SQL module (116) includes a primitives engine (114) implemented as computer program instructions that execute primitive query functions in dependence upon the access plan. A 'primitive query function,' or simply a 'primitive,' is a software function that carries out actual operations on a database, retrieving records from tables, inserting records into tables, deleting records from tables, updating records in tables, and so on. Primitives correspond to parts of an access plan and are identified in the access plan. Examples of primitives include the following database instructions:
  retrieve the next three records from the stores table into hash table H1,
  retrieve one record from the transactions table into hash table H2,
  join the results of the previous two operations,
  store the result of the join in table T1.

In addition to the SQL module (116), the exemplary DBMS of FIG. 1 also includes a backup module (100), a set of computer program instructions that backs up the database (118) by copying records (122) from the database (118) to a backup database (119). The system of FIG. 1 operates generally for backing up a database (118) according to embodiments of the present invention by providing in the database (118) by the DBMS (118) at least one record (122) with at least one backup field (124) and backing up by the backup module (100) the at least one record (122) in dependence upon a value of the at least one backup field (124). The backup field (124) is a data element that controls the backing up of the record (122). FIG. 1, for convenience of explanation, shows one table (120), one record (122), and one backup field (124). Readers will recognize, however, that in typical systems that backup a database according to embodiments of the present invention, the database (118) will include many tables, records, and backup fields, and the backup module (100) will operate in a loop that scans through the database record by record and backs up records according to the values of the backup fields in the records. A backup field (124) may be a data element having a value that specifies whether to backup the record containing the backup field. Such a data element may be a Boolean field having values TRUE or FALSE, TRUE indicating that the record is to be backed up, FALSE indicating that the record is not to be backed up. The backup field may be a data element having a value that specifies when to backup the record. A value that specifies when to backup the record may specify a frequency for backing up the record, and backing up the record may be carried out by backing up the record at the specified frequency, hourly, daily, weekly, and so on, for example. A value that specifies when to backup the record may specify a sequence for backing up the record among other records, and backing up the record may be carried out by backing up the record in the specified sequence, first, second, third, . . . last, and so on.

Backing up a database in accordance with the present invention is generally implemented with computers, that is, with automated computing machinery. For further explanation, therefore, FIG. 2 sets forth a block diagram of automated computing machinery comprising an exemplary computer (152) useful in backing up a database according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a DBMS (106), computer program instructions for database management. The DBMS (106) of FIG. 2 includes an SQL module (116), which in turn includes an access plan generator (112), a statistics engine (206), and a primitives engine (114), each of which implement computer program instructions stored in RAM (168) that operate computer (152) as described above. The DBMS (106) of FIG. 2 also includes a backup module (100). The backup module (100) is a set of computer program instructions, a module of the DBMS, configured for backing up a database according to embodiments of the present invention. Also stored in RAM is a database (118) that includes at least one table (120), at least one record (122), and at least one backup field (124).

Figure 2:
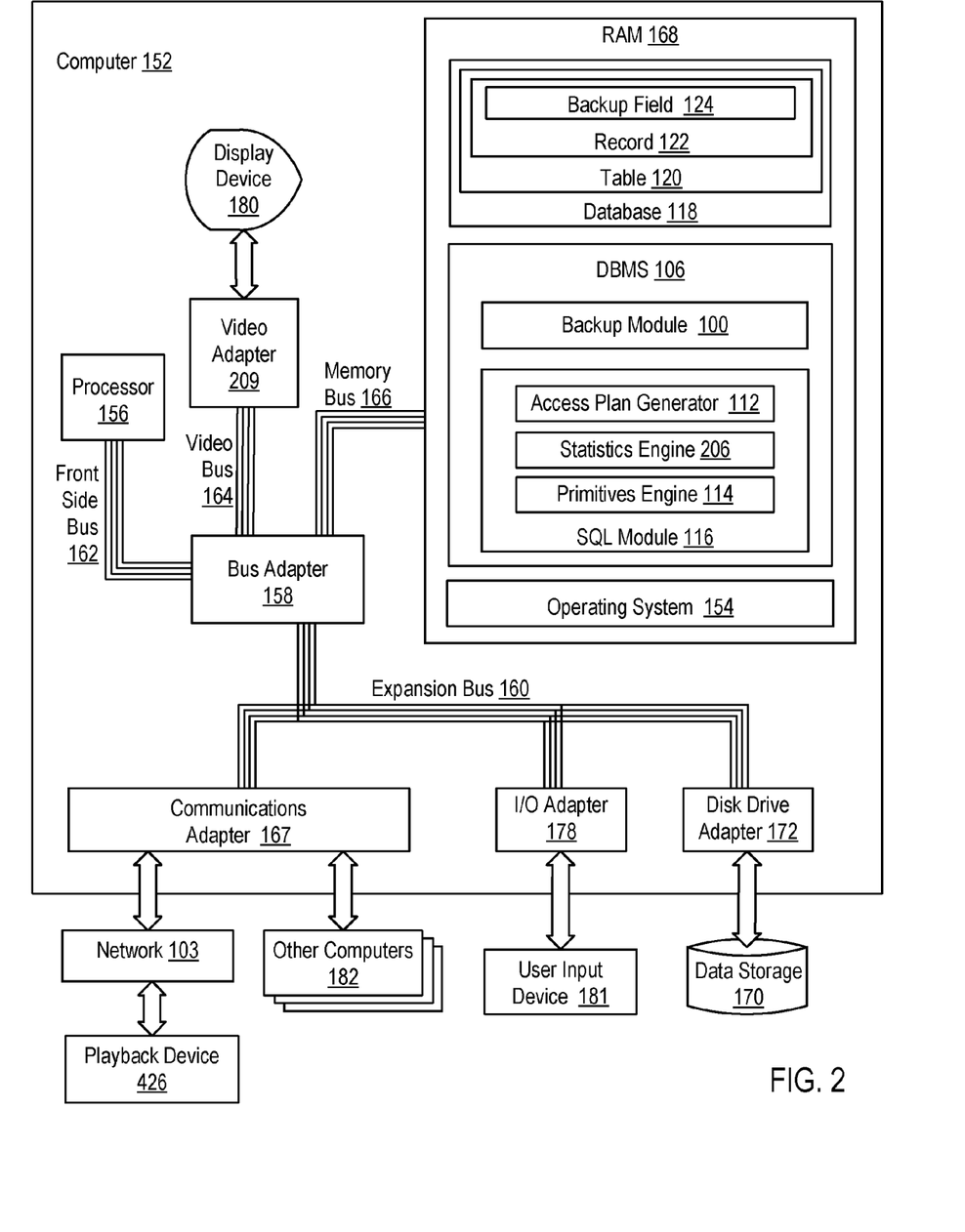
FIG. 2 sets forth a block diagram of automated computing machinery comprising an exemplary computer useful in backing up a database according to embodiments of the present invention.

The backup module (100) backs up the database (118) by copying records (122) from the database (118) to a backup database (119 on FIG. 1). The computer of FIG. 2 operates generally for backing up a database (118) according to embodiments of the present invention by providing in the database (118) by the DBMS (106) at least one record (122) with at least one backup field (124) and backing up by the backup module (100) the at least one record (122) in dependence upon a value of the at least one backup field (124). The backup field (124) is a data element that controls the backing up of the record (122). FIG. 2, for convenience of explanation, shows one table (120), one record (122), and one backup field (124). Readers will recognize, however, that in typical computers that backup a database according to embodiments of the present invention, the database (118) will include many tables, records, and backup fields, and the backup module (100) will operate in a loop that scans through the database record by record and backs up records according to the values of the backup fields in the records. A backup field (124) may be a data element having a value that specifies whether to backup the record containing the backup field. Such a data element may be a Boolean field having values TRUE or FALSE, TRUE indicating that the record is to be backed up, FALSE indicating that the record is not to be backed up. The backup field may be a data element having a value that specifies when to backup the record. A value that specifies when to backup the record may specify a frequency for backing up the record, and backing up the record may be carried out by backing up the record at the specified frequency, hourly, daily, weekly, and so on, for example. A value that specifies when to backup the record may specify a sequence for backing up the record among other records, and backing up the record may be carried out by backing up the record in the specified sequence, first, second, third, . . . last, and so on.

Also stored in RAM (168) is an operating system (154). Operating systems useful backing up a database according to embodiments of the present invention include UNIX™, Linux™, Microsoft XP™, AIX™, IBM's i5/OS™, and others as will occur to those of skill in the art. The operating system (154), the DBMS (106), and the database (118) in the example of FIG. 2 are shown in RAM (168), but many components of such software typically are stored in non-volatile memory also, such as, for example, on a disk drive (170).

The computer (152) of FIG. 2 includes a disk drive adapter (172) coupled through expansion bus (160) and bus adapter (158) to processor (156) and other components of the computer (152). The disk drive adapter (172) connects non-volatile data storage to the computer (152) in the form of disk drive (170). Disk drive adapters useful in computers for backing up a database according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (103). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for backing up a database according to embodiments of the present invention include modems for wired dial-up communications, Ethernet (IEEE 802.3) adapters for wired data communications network communications, and 802.11 adapters for wireless data communications network communications.

Figure 3:
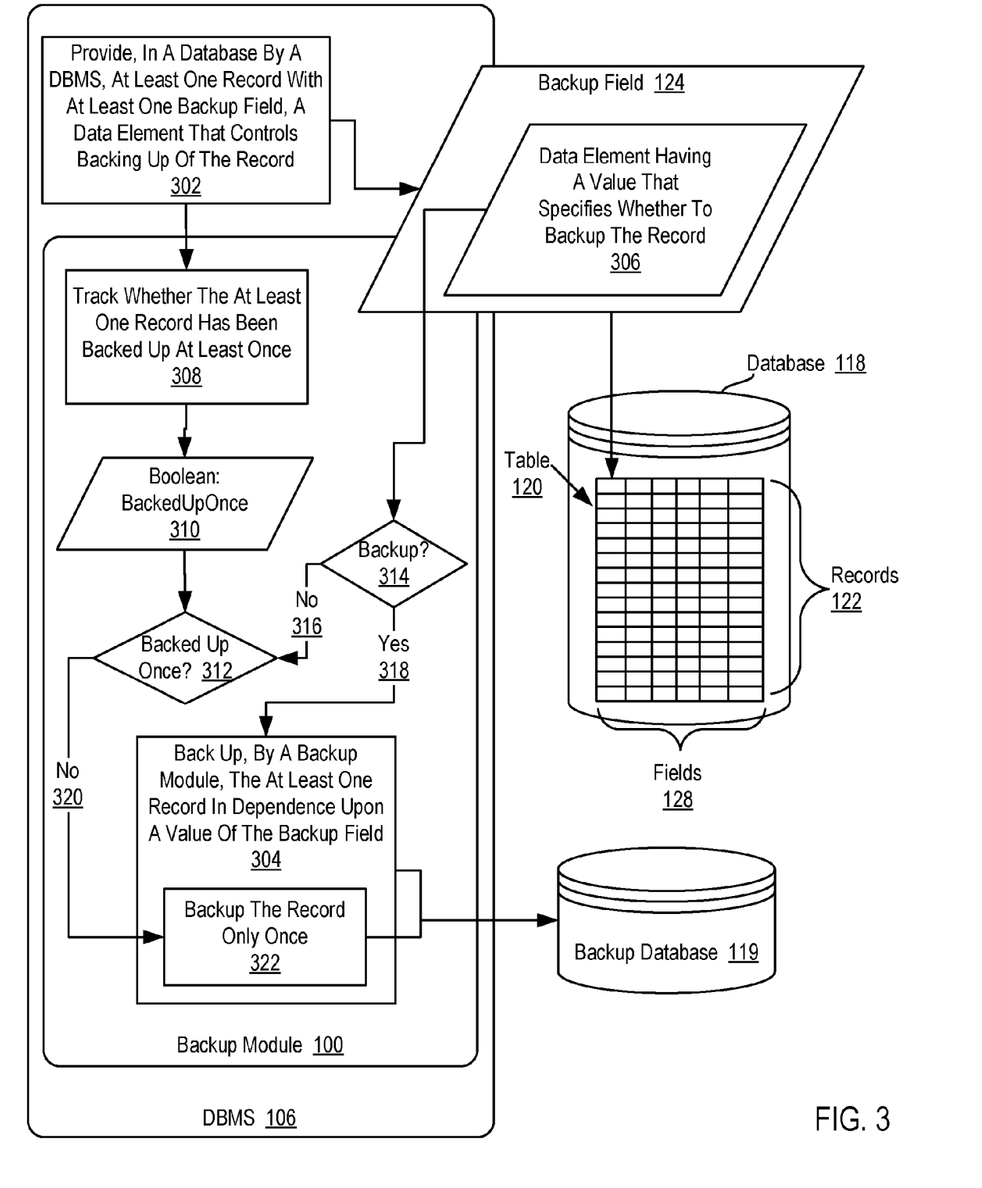
FIG. 3 sets forth a flow chart illustrating an exemplary method for backing up a database according to embodiments of the present invention.

For further explanation, FIG. 3 sets forth a flow chart illustrating an exemplary method for backing up a database (118) according to embodiments of the present invention. The database includes a table (120), the table includes records (122), the records include fields (128), and the database (118) is operated by a DBMS (106) that includes a backup module (100) like the ones described above with regard to references (106, 100) on FIG. 1. The backup module (100) operates in a loop that scans through the database (118) record by record and backs up records according to the values of the backup fields in the records. That is, the backup module determines for each record whether and when to backup the record in accordance with the values of the one or more backup fields in the record.

The method of FIG. 3 includes providing (302), in the database by the DBMS, at least one record (122) with at least one backup field (124). The backup field is a data element in a record (122) that controls the backing up of the record. The method of FIG. 3 also includes backing up (304), by the backup module, the record in dependence upon a value of the backup field. In the example of FIG. 3, the backup field (124) is a data element (306) having a value that specifies whether to backup the record. Such a data element may be a Boolean field having values TRUE and FALSE, TRUE indicating that the record is to be backed up, FALSE indicating that the record is not to be backed up.

The method of FIG. 3 also includes tracking (308) whether the at least one record has been backed up at least once. Such tracking may be carried out by an additional backup field, for example, a Boolean field in which the value TRUE indicates that the record has been backed up at least once and FALSE indicates no previous backup. In the method of FIG. 3, backing up (304) the record includes backing up (322) the record only once if the value (306) that specifies whether to backup the at least one record specifies that the record is not (316) to be backed up. That is, the method of FIG. 3 includes a determination (314) whether to backup the record according to the value of the backup field, which in this example is a data element (306) whose value specifies whether to backup the record containing the backup field. If the determination is that the backup field specifies a backup (318), backup (304) proceeds normally. If the determination is that the backup field specifies no backup (316), the record is nevertheless backed up at least once (320, 322). The backup fields can be made available for users to edit or change at will, including users specifying that certain records are not to be backed up at all, and this 'at least one backup' step is optional depending on the particular embodiment or installation. It has the advantage, however, of providing the efficiency of avoiding the cost of repeated backups while still providing at least some protection against data loss, and it can function effectively even for records specified by users for no backup.

Figure 4:
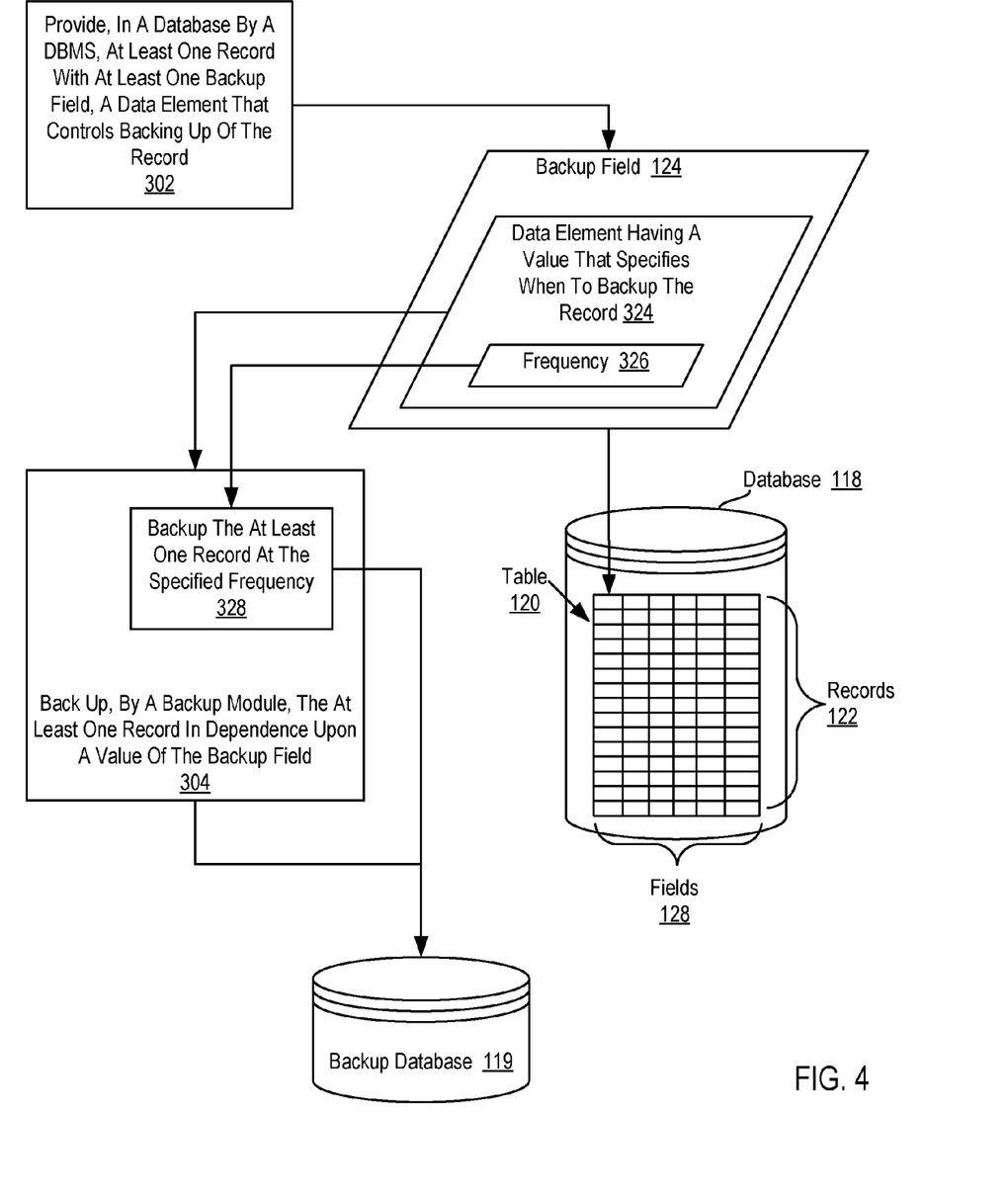
FIG. 4 sets forth a flow chart illustrating a further exemplary method for backing up a database according to embodiments of the present invention.

For further explanation, FIG. 4 sets forth a flow chart illustrating a further exemplary method for backing up a database according to embodiments of the present invention. The method of FIG. 4 is similar to the method of FIG. 3, including as it does providing (302) in a database (118) a record (122) with at least one backup field (124) and backing up (304) the record in dependence upon a value of the backup field. In the method of FIG. 4, however, unlike the method of FIG. 3, the backup field (124) is a data element (324) having a value that specifies when to backup the record. Even more specifically, in the method of FIG. 3, the value (324) that specifies when to backup the record specifies a frequency (326) for backing up the record, such as, for example, hourly, daily, weekly, monthly, and so on. Also in the method of FIG. 4, backing up (304) the record includes backing up the record at the specified frequency.

Figure 5:
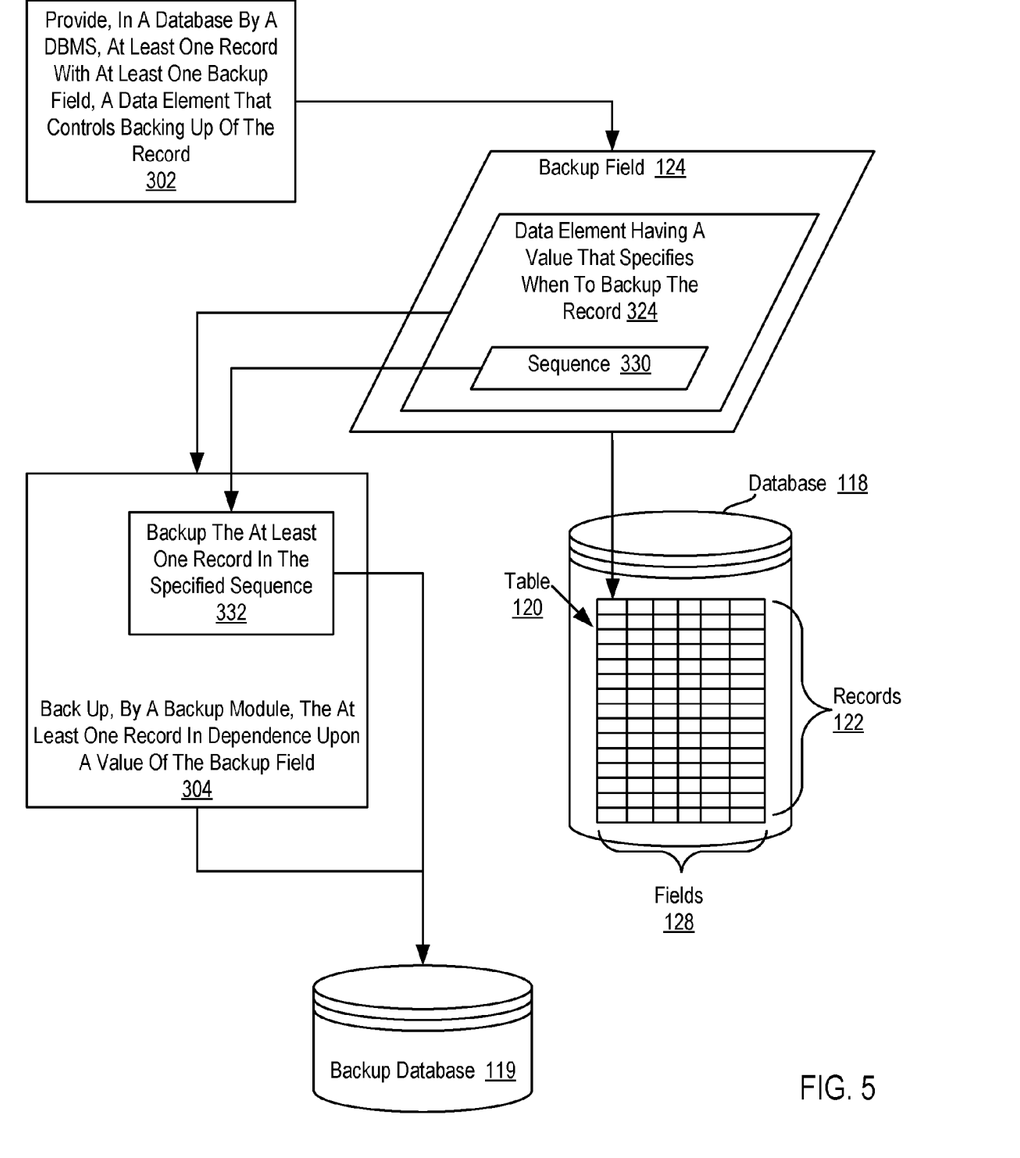
FIG. 5 sets forth a flow chart illustrating a further exemplary method for backing up a database according to embodiments of the present invention.

For further explanation, FIG. 5 sets forth a flow chart illustrating a further exemplary method for backing up a database according to embodiments of the present invention. The method of FIG. 5 is similar to the method of FIG. 4, including as it does providing (302) in a database (118) a record (122) with at least one backup field (124) and backing up (304) the record in dependence upon a value of the backup field. In the method of FIG. 5, also like the method of FIG. 4, the backup field (124) is a data element (324) having a value that specifies when to backup the record. Unlike the method of FIG. 4, however, in the method of FIG. 5, the value (324) that specifies when to backup the record specifies a sequence (326) for backing up the record, such as, for example, first, second, third, . . . last, and so on. Also in the method of FIG. 4, backing up (304) the record includes backing up the record in the specified sequence. This method benefits users who want to backup active records first as well as users who want to backup the active records last depending on whether it is important to the user to have these records current at the beginning of a replication period or at the end of the replication period.

In view of the explanations set forth above, readers will recognize that the benefits of backing up a database according to embodiments of the present invention include granting to database administrators and even to end users the tremendous flexibility and power to control backup on a record-by-record basis through an entire database.

Exemplary embodiments of the present invention are described largely in the context of a fully functional computer system for backing up a database. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of backing up a database, the database comprising a table, the table comprising at least two records, the at least two records each comprising at least one field, the database operated by a database management system (DBMS), the DBMS comprising a backup module, the method comprising:
   providing, in the database by the DBMS, the at least two records, each of the at least two records comprising at least one backup field, the at least one backup field of a corresponding record comprising a data element that controls backing up of the corresponding record, the data element indicating whether to backup the corresponding record, wherein the at least one backup field indicates a frequency that specifies a rate of occurrence for backing up the corresponding record;
   tracking whether the at least two records have been backed up at least once;
   scanning through the database record by record, by the backup module of the DBMS, to periodically scan the at least two records and identify the frequency specified by the at least one backup field of each of the at least two records; and
   backing up to a backup database, by the backup module, at least one record of the at least two records in dependence upon a value of the at least one backup field corresponding to the at least one record, including an automated backing up of the at least one record to the backup database at the frequency indicated by the at least one backup field corresponding to the at least one record,
   wherein the DBMS and the backup module comprise one or more of logic hardware and executable code, the executable code stored on a computer readable storage medium.

2. The method of claim 1 wherein backing up the at least one record further comprises backing up the at least one record only once if the data element that indicates whether to backup the at least one record indicates that the record is not to be backed up.

3. The method of claim 1 wherein each backup field comprises a value that indicates when to backup the corresponding record.

4. The method of claim 3 wherein:
   the value that indicates when to backup the corresponding record indicates a sequence for backing up the corresponding record among other records of the database; and
   backing up the at least one record further comprises backing up the at least one record and the other records in the indicated sequence.

5. An apparatus for backing up a database, the apparatus comprising:
   a database management system ("DBMS") that operates a database, the database comprising a table, the table comprising at least two records, the DBMS providing, in the database, the at least two records, each of the at least two records comprising at least one backup field, the at least one backup field of a corresponding record comprising a data element that controls backing up of the corresponding record, the data element indicating whether to backup the corresponding record, wherein the at least one backup field indicates a frequency that specifies a rate occurrence for backing up the corresponding record; and
   a backup module of the DBMS, the backup module tracking whether the at least two records have been backed up at least once, the backup module scanning through the database record by record to periodically scan the at least two records and identify the frequency specified by the at least one backup field of the at least two records, the backup module backing up at least one record of the at least two records to a backup database in dependence upon a value of the at least one backup field corresponding to the at least one record, including an automated backing up of the at least one record to the backup database at the frequency indicated by the at least one backup field corresponding to the at least one record,
   wherein the DBMS and the backup module comprise one or more of logic hardware and executable code, the executable code stored on a computer readable storage medium.

6. The apparatus of claim 5, wherein the backup module backs up the at least one record only once in response to the data element that indicates whether to backup the at least one record indicating that the record is not to be backed up.

7. The apparatus of claim 5 wherein each backup field comprises a a value that indicates when to backup the corresponding record.

8. The apparatus of claim 7 wherein:
   the value that indicates when to backup the corresponding record indicates a sequence for backing up the corresponding record among other records of the database; and
   the backup module backs up the at least one record and the other records in the indicated sequence.

9. A computer program product for backing up a database, the database comprising a table, the table comprising at least two records, the at least two records comprising at least one field, the database operated by a database management system ('DBMS'), the DBMS comprising a backup module, the computer program product disposed in a machine-readable, recordable medium, the computer program product comprising computer program instructions capable of:
   providing, in the database by the DBMS, the at least two records, each of the at least two records comprising at least one backup field, the at least one backup field of a corresponding record comprising a data element that controls backing up of the corresponding record, the data element indicating whether to backup the corresponding record, wherein the at least one backup field indicates a frequency that specifies a rate of occurrence for backing up the corresponding record;
   tracking whether the at least two records have been backed up at least once;
   scanning through the database record by record, by the backup module of the DBMS, to periodically scan the at least two records and identify the frequency specified by the at least one backup field of each of the at least two records; and backing up to a backup database, by the backup module, at least one record of the at least two records in dependence upon a value of the at least one backup field corresponding to the at least one record, including an automated backing up of the at least one record to the backup database at the frequency indicated by the at least one backup field corresponding to the at least one record.

10. The computer program product of claim 9 wherein backing up the at least one record further comprises backing up the at least one record only once if the data element that indicates whether to backup the at least one record indicates that the record is not to be backed up.

11. The computer program product of claim 9 wherein each backup field comprises a value that indicates when to backup the corresponding record.

12. The computer program product of claim 11 wherein:
the value that indicates when to backup the corresponding record indicates a sequence for backing up the corresponding record among other records of the database; and
backing up the at least one record further comprises backing up the at least one record and the other records in the indicated sequence.

\* \* \* \* \*